(12) United States Patent
Lavrentyev et al.

(10) Patent No.: US 12,411,484 B2
(45) Date of Patent: Sep. 9, 2025

(54) SYSTEM AND METHOD FOR DIAGNOSTICS AND MONITORING OF ANOMALIES OF A CYBER-PHYSICAL SYSTEM

(71) Applicant: AO Kaspersky Lab, Moscow (RU)

(72) Inventors: Andrey B. Lavrentyev, Moscow (RU); Artem M. Vorontsov, Moscow (RU); Dmitry A. Ivanov, Moscow (RU); Vyacheslav I. Shkulev, Moscow (RU); Nikolay N. Demidov, Moscow (RU); Artyom M. Nechiporuk, Moscow (RU); Maxim A. Mamaev, Moscow (RU); Alexander V. Travov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 588 days.

(21) Appl. No.: 17/973,796

(22) Filed: Oct. 26, 2022

(65) Prior Publication Data

US 2023/0205193 A1   Jun. 29, 2023

(30) Foreign Application Priority Data

Dec. 28, 2021 (RU) .......................... RU2021139349

(51) Int. Cl.
G05B 23/02 (2006.01)
(52) U.S. Cl.
CPC ..... *G05B 23/0243* (2013.01); *G05B 23/0216* (2013.01); *G05B 23/0221* (2013.01); *G05B 23/024* (2013.01); *G05B 23/0281* (2013.01)

(58) Field of Classification Search
CPC ............ G05B 23/0243; G05B 23/0216; G05B 23/0221; G05B 23/024; G05B 23/0281
See application file for complete search history.

(56) References Cited

U.S. PATENT DOCUMENTS

| | | | |
|---|---|---|---|
| 10,680,919 B2 | 6/2020 | Mermoud et al. | |
| 10,826,932 B2 * | 11/2020 | Abbaszadeh | G06N 5/04 |
| 11,175,976 B2 | 11/2021 | Lavrentyev et al. | |
| 11,551,111 B2 * | 1/2023 | Katz | G01D 3/08 |
| 11,720,072 B2 * | 8/2023 | Bertinetti | G05B 19/4183 703/13 |
| 11,874,930 B2 * | 1/2024 | Rieger | G05B 23/024 |

(Continued)

*Primary Examiner* — Michael J Jansen, II
(74) *Attorney, Agent, or Firm* — ArentFox Schiff LLP; Michael Fainberg

(57) ABSTRACT

A method for diagnostics and monitoring of anomalies in a cyber-physical system (CPS) includes obtaining information related to anomalies identified in the CPS. The obtained information includes at least one value of one or more CPS variables. One or more classifying features of the identified anomalies in the CPS are generated based on the obtained information. Classification of the identified anomalies in the CPS into two or more anomaly classes is performed based on the generated classifying features. Each of the two or more anomaly classes is associated with one or more anomaly characteristics. Diagnostics of anomalies are performed in each of the two or more anomaly classes by calculating values of the anomaly characteristics associated with each of the two or more anomaly classes. Anomalies of each of the two or more anomaly classes are monitored based on the calculated values of the anomaly characteristics associated with each of the two or more anomaly classes.

19 Claims, 10 Drawing Sheets

(56) References Cited

U.S. PATENT DOCUMENTS

| | | | |
|---|---|---|---|
| 11,989,010 B2* | 5/2024 | Michan | G05B 19/41865 |
| 12,346,102 B2* | 7/2025 | Cussonneau | G06F 30/20 |
| 2019/0004484 A1* | 1/2019 | Cussonneau | G05B 13/04 |
| 2019/0325328 A1* | 10/2019 | Katz | G06F 17/14 |
| 2020/0067969 A1* | 2/2020 | Abbaszadeh | G06N 5/04 |
| 2020/0103838 A1* | 4/2020 | Bertinetti | G05B 19/4183 |
| 2020/0210263 A1 | 7/2020 | Lavrentyev et al. | |
| 2021/0089661 A1* | 3/2021 | Rieger | G06F 11/0736 |
| 2022/0163947 A1* | 5/2022 | Michan | G05B 23/0281 |
| 2023/0205193 A1* | 6/2023 | Lavrentyev | G05B 23/0243 |
| | | | 702/183 |
| 2023/0376024 A1* | 11/2023 | Geißelsöder | G05B 23/0254 |
| 2023/0418272 A1* | 12/2023 | Pack | G05B 23/0221 |
| 2024/0333742 A1* | 10/2024 | Mamaev | H04L 63/1425 |

\* cited by examiner

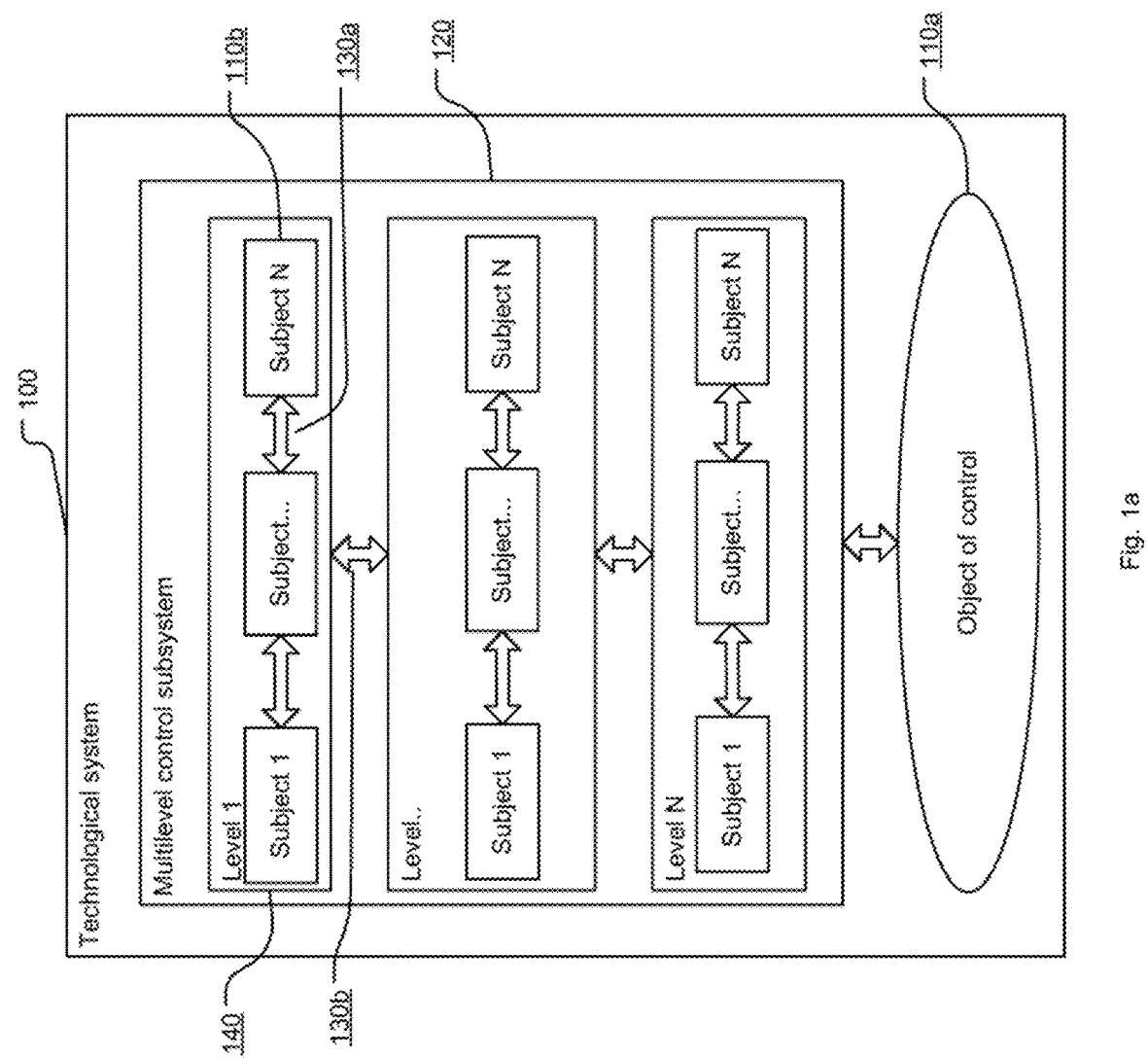

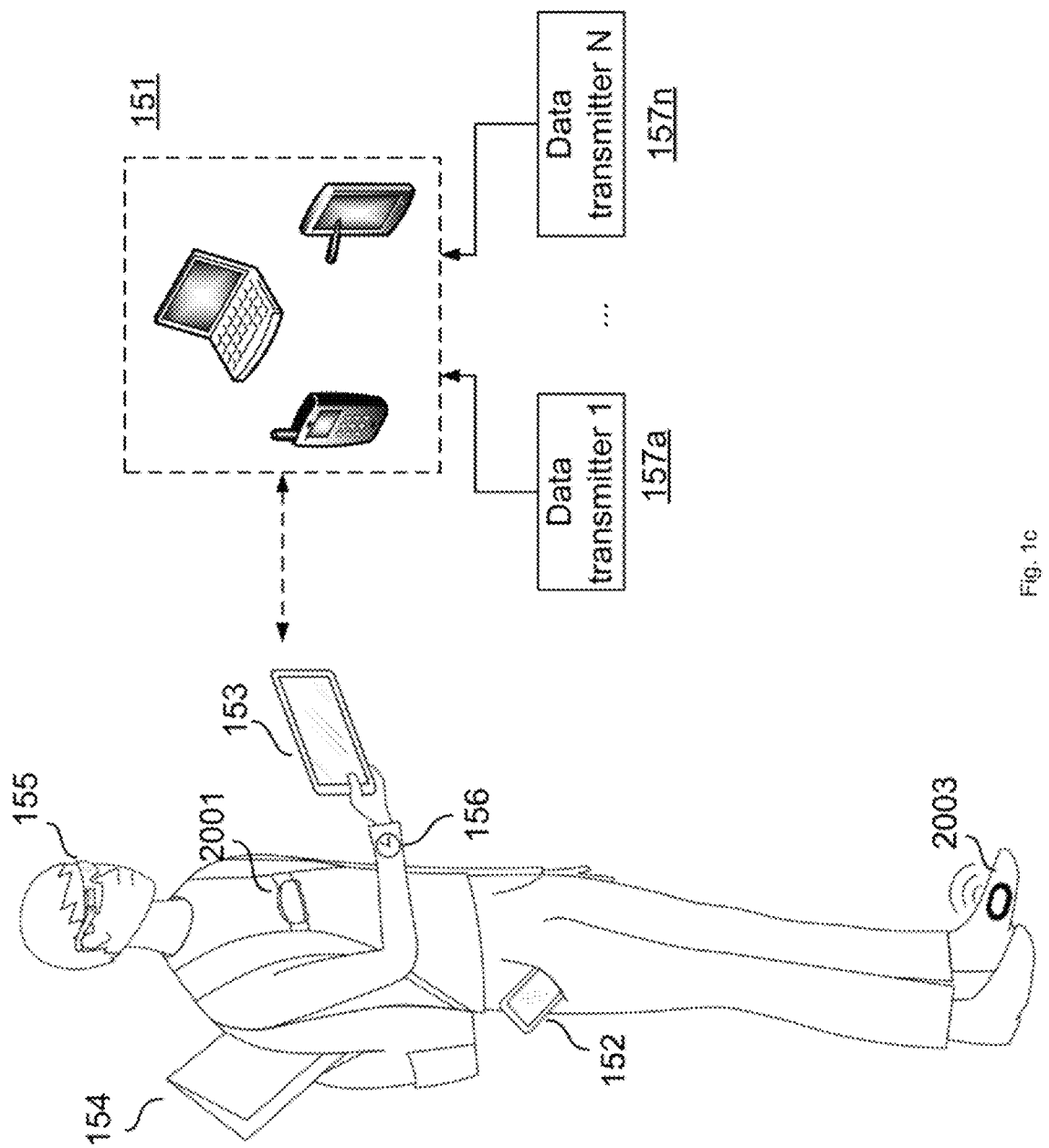

| 2001 | Heart rhythm monitor |
| 2002 | Blood oxygen saturation detector |
| 2003 | Pedometer |
| 2004 | Fingerprint detector |
| 2005 | Gesture detector |
| 2006 | Cameras |
| 2007 | Body temperature detector |
| 2008 | Microphone |
| 2009 | Ultraviolet radiation detector |
| 2010 | Geolocation system receiver |
| 2011 | GSM module |
| 2012 | Bluetooth module |
| 2013 | Wi-Fi |
| 2014 | Room temperature detector |
| 2015 | Barometer |
| 2016 | Geomagnetic sensor |
| 2017 | Humidity detector |
| 2018 | Illumination detector |
| 2019 | Proximity detector |
| 2020 | Image depth detector |
| 2021 | Accelerometer |
| 2022 | Gyroscope |
| 2023 | Hall detector |
| 2024 | Dosimeter/radiometer |
| 2025 | NFC module |
| 2026 | LTE module |

Fig. 1d

SYSTEM AND METHOD FOR DIAGNOSTICS AND MONITORING OF ANOMALIES OF A CYBER-PHYSICAL SYSTEM

CROSS-REFERENCE TO RELATED APPLICATION

This application claims benefit of priority under 35 U.S.C. 119(a)-(d) to a Russian Application No. 2021139349 filed on Dec. 28, 2021, which is incorporated by reference herein.

FIELD OF TECHNOLOGY

The present invention relates generally to the field of industrial safety and, more specifically, to systems and methods for diagnostics and monitoring of anomalies of a cyber-physical system (CPS).

BACKGROUND

One of the urgent issues of industrial safety is the problem of safe functioning of technological processes (TP) and operations. Among the main threats of a TP are wear and tear and failure of equipment and subassemblies, unintentional mistakes or malicious actions in the operational control, computer attacks on the control system and information system (IS), and the like.

In order to counteract various threats, safety systems may be used traditionally for protection of cyber-physical systems (CPS). The safety systems may include, but are not limited to, emergency protection systems (EPS), anomaly detection systems based on an automated control system for a technological process (ACS TP), and specially built "external" monitoring systems for a particular kind of equipment and subassemblies. Generally, the "external" monitoring systems are not necessarily integrated with the ACS TP. It should be noted that it may not be always possible to deploy the aforementioned "external" systems, by virtue of certain peculiarities of the CPS and the TP occurring in them. However, even in the simplest cases where such an installation is possible, deployment of "external" monitoring systems typically occurs only at critically vital nodes and subassemblies of the enterprise due to the cost and complexity of servicing such systems.

By contrast with "external" systems, the EPS may be designed during the design of the enterprise and may be integrated in the ACS TP. Such integration may prevent previously known critical processes from taking place. One advantage of the EPS is its simplicity, its orientation to production processes of a particular enterprise, and its inclusion of all the design and technology solutions adopted at that enterprise. The drawbacks of the EPS may include, but are not limited to, rather sluggish decision making in the system and the presence of the human factor in the making of these decisions. Furthermore, the EPS and associated methodology typically functions under the assumption of properly working monitoring and measuring instruments (MMI). In practice, it is not always possible to ensure a faultless operation of the MMI in full, because the MMIs periodically break down, have a tendency to temporary failures. Furthermore, redundancy for all the MMI is extremely costly and not always technically feasible.

Anomaly detection systems are typically based on the telemetry of an ACS TP. Due to completeness of such telemetry data, anomaly detection systems may have the capability of "seeing" all the TPs of an enterprise at the same time in their interrelationship with each other, which makes it possible to detect anomalies reliably even during failures of the MMI. The wealth of data provided in the ACS TP enables monitoring of the entire enterprise—both the physical (chemical or other) processes of the enterprise and the proper working of all monitoring systems for these processes, which may include correct actions by the production operators. The machine learning models used in such systems may be trained based on a number of inputs and characteristics. Such trained models may include highly effective statistical models for the proper working of an enterprise with an enormous number of analyzed variables. Such trained models may be able to find even slight deviations in the working of the equipment. In other words, anomaly detection systems may detect an anomaly at an early stage.

The special architecture and interface of anomaly detection systems allows them to work in parallel with the ACS TP to find anomalies (fault detection), to display and localize (fault isolation) the anomalies found, and also to notify the production operators as to the anomalies found, indicating, for example, the particular process variables used to determine that anomaly.

However, the existing systems for determination and localization of security related anomalies and threats using the telemetry data of the ACS TP are not well equipped to deal with a third traditional problem of anomaly monitoring. More specifically, the existing systems are not well equipped to deal with the technically complicated issue of anomaly diagnostics itself (fault diagnosis), classification of anomalies according to their types (classes), filtering of unimportant anomalies, determination of certain characteristic anomalies, forecasting of the development of an anomaly, and the like. Typically, the type of analysis of anomalies that is the most in demand by production includes assessing the danger of certain anomalies, retrospective analysis of their development, predictive evaluation of the one or more characteristics of anomalies, and the possibility of the enterprise operators working out the most economically advantageous strategies for their correction. The specific type of analysis of previously found anomalies is possible in the overwhelming majority of instances, since the telemetry data of the ACS TP contain an exhaustive volume of information on the functioning of the particular enterprise, the course of all of its physical, chemical, and other processes, and complete information as to the control processes. However, such telemetry information typically contains only the raw, unprocessed and unmarked data.

Thus, there is a need for automated systems for efficient diagnostics and monitoring of previously found anomalies in a CPS based on telemetry data. This need is urgent for all CPS which contain any of the following: MMI, actuators, or monitoring systems.

SUMMARY

Disclosed are systems and methods for creating automated systems for diagnostics and monitoring of previously found anomalies in a CPS based on telemetry data.

Advantageously, the disclosed method performs automated diagnostics and monitoring of anomalies in a CPS by classification of the previously found anomalies, diagnostics of the anomalies of each class, and subsequent monitoring of the CPS to identify anomalies of each class.

In one aspect, a method for diagnostics and monitoring of anomalies in a cyber-physical system (CPS) includes obtaining information related to anomalies identified in the CPS. The obtained information includes at least one value of one or more CPS variables. One or more classifying features of the identified anomalies in the CPS are generated based on the obtained information. Classification of the identified anomalies in the CPS into two or more anomaly classes is performed based on the generated classifying features. Each of the two or more anomaly classes is associated with one or more anomaly characteristics. Diagnostics of anomalies are performed in each of the two or more anomaly classes by calculating values of the anomaly characteristics associated with each of the two or more anomaly classes. Anomalies of each of the two or more anomaly classes are monitored based on the calculated values of the anomaly characteristics associated with each of the two or more anomaly classes.

In one aspect, monitoring the CPS to identify anomalies further includes: predicting at least one value of the one or more CPS variables; determining total forecast error based on the predicted values of the one or more CPS variable; and identifying an anomaly if the determined forecast error exceeds a predefined threshold value.

In one aspect, monitoring the CPS to identify anomalies further includes identifying an anomaly by applying a trained machine learning model to the at least one value of the one or more CPS variables.

In one aspect, monitoring the CPS to identify anomalies further includes: determining if at least one value of the one or more CPS variables lies outside bounds of a previously specified range of values for the corresponding CPS variable; and identifying an anomaly in response to determining that the value of at least one of the one or more CPS variables lies outside bounds of the previously specified range of values for the corresponding CPS variable.

In one aspect, the obtained information further includes at least one of: a time interval of observation of the detected anomaly, contribution of each of the one or more CPS variable to the detected anomaly, information about detection method of the detected anomaly, values of the one or more CPS variables at each time instance of the time interval of observation.

In one aspect, the obtained information further includes for each of the one or more CPS variables: a time series of the corresponding CPS variable values; a current magnitude of the deviation of the predicted CPS variable value from an actual CPS variable value; a smoothed value of the deviation of the predicted CPS variable value from the actual CPS variable value.

In one aspect, the values of the one or more CPS variables include at least one of: a measurement of a data transmitter; a value of a manipulated variable of an actuating mechanism; a setpoint of the actuating mechanism; one or more values of input signals of a proportional-integral-derivative controller (PID controller); a value of an output signal of the PID controller.

In one aspect, the one or more classifying features are generated by assigning to each of the one or more classifying features the one or more CPS variables.

In one aspect, the method further includes transforming values of the one or more CPS variables prior to assigning the values to the corresponding classifying feature.

In one aspect, the one or more classifying features are generated based on a feedback from an operator of the CPS.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1a shows a schematic illustration of an exemplary technological system.

FIG. 1c is a diagram illustrating one possible variant of the organization of the Internet of things on the example of portable devices.

FIG. 1d presents a block diagram illustrating one possible set of data transmitters of devices.

DETAILED DESCRIPTION

Figure 1B:
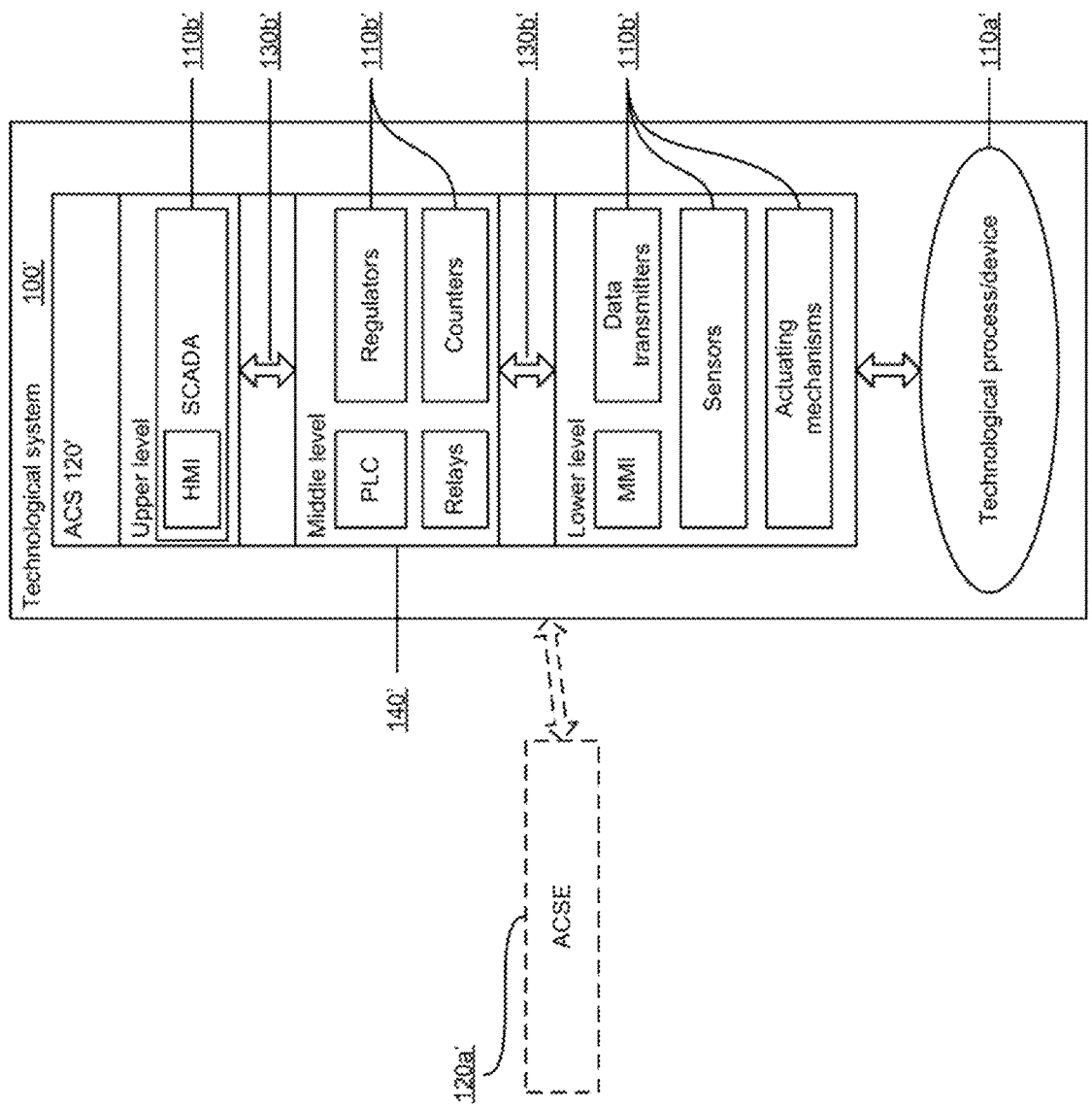
FIG. 1b shows schematically a particular example of the implementation of a technological system.

Exemplary aspects are described herein in the context of a system, method, and computer program product detecting a harmful file. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Glossary: a number of terms are defined herein which will be used to describe variant aspects of the present disclosure.

Object of control—a technological object to which external actions are applied (controlling and/or perturbing actions) in order to alter its state. In particular, object of control may be a device (such as an electric motor) or a technological process (or a portion thereof).

Technological process (TP)—a process of material production comprising the consecutive change of the states of a material entity (e.g., an object of work).

Control loop—material entities and controlling functions needed for automated regulation of the values of the metered process variables to take on the values of desired setpoints. A control loop may include, but is not limited to, data transmitters and sensors, controllers, and actuators.

Process Variable (PV)—a current metered value of a particular portion of a TP which is being observed or monitored. For example, the measurement of a data transmitter may be a process variable.

Setpoint—the value of a process variable which is to be maintained.

Manipulated Variable (MV)—a variable which is regulated such that the value of a process variable is maintained at the level of a setpoint.

External action—a method of changing the state of an element to which the action is applied (for example, an element of a technological system (TS)) in a certain direction. The external action may be transmitted in the form of a signal from one element of the TS to another element of the TS.

State of an object of control—the entirety of object's essential attributes, as expressed by the variables of the states which are to be changed or maintained under the influence of the external actions, including, but not limited to, the controlling actions on the part of the control subsystem. A variable of state is one or more numerical values characterizing an essential attribute of an object. The variable of state may be a numerical value of a physical quantity.

Formal state of an object of control—the state of an object of control corresponding to the process chart and other process documentation (if it involves a TP) or a movement itinerary (if it involves a device).

Controlling action—a goal-oriented (the goal of the action is an action on the state of the object), legitimate (specified by the TP), external action on the part of the subjects of control of a control subsystem on an object of control, bringing about a change in the state of the object of control or maintaining the state of the object of control.

Subject of control—a device which applies a controlling action to an object of control or transmits a controlling action to another subject of control for its transformation prior to being applied directly to the object.

State of a subject of control—the entirety of subject's essential attributes as expressed by the variables of state which are to be changed or maintained under the influence of external actions. A variable of state is one or more numerical values characterizing an essential attribute of a subject. The state variable may be a numerical value of a physical quantity.

Essential attributes (respectively, also essential state variables) of a subject of control—attributes exerting a direct influence on the state of an object of control. The essential attributes of an object of control are attributes exerting a direct influence on monitored factors (such as, but not limited to, accuracy, safety, effectiveness) of the functioning of a TS. For example, essential attributes may include the compliance of cutting conditions with the formally designated conditions, the movement of a train in accordance with its itinerary, the maintaining of a reactor temperature within permissible bounds. Depending on the monitored factors, variables of state of the object of control and related variables of state of the subjects of control exerting control actions on the object of control are selected.

Multilevel control subsystem—the entirety of subjects of control involving multiple levels.

Cyber-physical system—a concept in information technology signifying an integration of computing resources in physical processes. In a CPS system, data transmitters, equipment, and computer systems are connected along the course of the entire chain of value creation, beyond the framework of a single enterprise or business. These systems interact with each other by means of standard Internet protocols for the forecasting, self-adjusting, and adapting to changes. Examples of a cyber-physical system include, but are not limited to a technological system, the Internet of Things (IoT) (including portable devices), and the industrial Internet of Things.

Internet of Things—a computer network of physical objects ("things"), equipped with built-in network technologies for interacting with each other or with the outer world. The Internet of Things may include, but is not limited to, portable devices, electronic systems of means of transportation, smart cars, smart cities, industrial systems, and others.

Industrial Internet of Things (IIoT)—equipment and platforms of extended analytics, connected to the Internet, which perform a processing of data obtained from connected devices. The devices of the IIoT may be as diverse as possible—ranging from small weather data transmitters to complex industrial robots. Even though the term "industrial" conjures up such associations as warehouses, shipyards, and factory halls, the IIoT technology has a great potential for use in the most diverse of fields, including, but not limited to, agriculture, health care, financial services, retail trade, and advertising. The industrial Internet of Things is a subcategory of the Internet of Things.

Technological system (TS)—the functionally interconnected entirety of the subjects of control of a multilevel control subsystem and an object of control (a TP or device), realizing a change in the state of the object of control through changing the states of the subjects of control. The architecture of the technological system is formed by the basic elements of the technological system (the interconnected subjects of control of the multilevel control subsystem and the object of control), as well as the links between these elements. In the case when the object of control in the technological system is a technological process, the final goal of the control is to change the state of an object of work (raw material, machining blanks, etc.) by changing the state of the object of control. When the object of control in the technological system is a device, the final goal of the control is to change the state of the device (for example, a means of transportation, a spacecraft, etc.). The functional interplay of the elements of the TS refers to the interplay between the states of these elements. There might not even be an immediate physical link between the elements. For example, there might be no physical link between the actuators and the technological operation. For example, the cutting speed is functionally related to the speed of revolution of a spindle, even though these state variables are not physically related.

Computer attack (also known as cyber-attack)—a deliberate action against computer systems and computer/telecommunication networks by hardware and software, carried out for purposes of violating the security of information in these systems and networks.

FIG. 1a shows a schematic illustration of an exemplary technological system (TS) 100 In an aspect, the components of the TS may include, but are not limited to: the object of control 110a; the subjects of control 110b, a multilevel control subsystem 120; horizontal links 130a and vertical links 130b. The subjects of control 110b are grouped by levels 140.

FIG. 1b shows schematically a particular example of an implementation of a technological system 100'. The object of control 110a' may include, but is not limited to, a TP or a device. Controlling actions may be applied to the object of control 110a' which may be worked out and realized by an automated control system (ACS) 120'. In an aspect, the ACS 120' may include three levels 140', which may include the subjects of control 110b', interconnected with each other both horizontally by the horizontal links (links within a level, not illustrated in FIG. 1b) and vertically by the vertical links 130b' (links between levels). The interconnecting links may be functional. In other words, in the general case a change in state of a subject of control 110b' on one level may produce a change in state of the subjects of control 110b' connected to it on this level and the other levels. Information about a change in state of a subject of control 110b' may be transmitted in the form of a signal along the horizontal and vertical links established between the subjects of control 110b'. For example, information about a change in state of a particular subject of control 110b' may be an external action in relation to the other subjects of control 110b'. The levels 140' in the ACS 120' may be defined in accordance with the purpose of the subjects of control 110b'. The number of levels may vary depending on the complexity of the ACS 120'. Simple systems may contain one or more lower levels. Wired networks, wireless networks, and integrated microcircuits may be used for the physical link of the elements of the TS (110a', 110b') and the subsystems of the TS 100'. Ethernet network, an industrial Ethernet, and industrial networks may be used for the logical link between the elements of the TS (110a', 110b') and the subsystems of the TS 100'. Different types and standards that may be used by the industrial networks and protocols include, but are not limited to: Profibus, FIP, ControlNet, Interbus-S, DeviceNet, P-NET, WorldFIP, LongWork, Modbus and others.

The upper level (the supervisory control and data acquisition level, SCADA) may be the level of dispatcher and operator control. The upper level may include, but is not limited to, at least the following subjects of control 110b': controllers, control computers, human-machine interfaces (HMI). It should be noted that FIG. 1b shows the SCADA within a single subject of control. The upper level may be configured to track the states of the elements of the TS (110a', 110b'), to obtain and store information about the state of the elements of the TS (110a', 110b'), and if necessary to correct this state.

The middle level (the CONTROL level) may be the level of the controllers. The middle level may include, but is not limited to at least the following subjects of control 110b': programmable logic controllers (PLC), counters, relays, regulators. The subjects of control 110b' of PLC type may be configured to obtain information from the subjects of control 110b' of monitoring and measuring instrument type and the subjects of control 110b' of data transmitter type regarding the state of the object of control 110a'. The subjects of control 110b' of PLC type may be further configured to create a controlling action in accordance with a programmed control algorithm for the subjects of control 110b' of actuator type. The actuators may be configured to directly realize the given controlling action (apply it to the object of control) at the lower level. An actuator may be a component of the actuating device (equipment). Regulators, such as, but not limited to, proportional-integral-derivative controllers or PID controllers may be devices with feedback in the control loop.

The lower level (the Input/Output level) may be the level that includes subjects of control 110b' such as, but not limited to, data transmitters and sensors, monitoring and measuring instruments (MMI), which monitor the state of the object of control 110a', actuators, and the like. The actuating mechanisms may be configured to act directly on the state of the object of control 110a' to bring it into conformity with a formal state. The formal state may include, for example, a state corresponding to the technological job order, the process chart, or some other process documentation (in the case of a TP) or movement itinerary (in the case of a device). On this lower level, the signals from the subjects of control 110b' of data transmitter type may be coordinated with the inputs of the subjects of control 110b' of the middle level. Furthermore, the controlling actions elaborated by the subjects of control 110b' of PLC type may be coordinated with the subjects of control 110b' of actuator type, which implement them. An actuator may be a component of an actuating device. An actuating device may be configured to move a regulating element in accordance with signals arriving from the regulator or a controlling device.

Actuating devices are the last link in the chain of automatic control. Generally, actuating devices may include, but are not limited to the following units:
- an amplifying device (contactor, frequency converter, amplifier, and the like);
- an actuating mechanism (electric, pneumatic or hydraulic drive) with feedback elements (detectors of the position of an output shaft, a signaling of end positions, a manual drive, and the like);
- a regulating element (gates, valves, slides, and the like).

Depending on the application conditions, actuating devices may differ in their design. The actuating mechanisms and regulating elements are usually among the basic units of the actuating devices.

In a particular example, the actuating device may comprise the actuating mechanism.

It should be noted that the tasks of planning and control of an enterprise may be handled by an ACSE 120a' (automatic control system for an enterprise), which may be a part of the ACS 120'.

FIG. 1c is a diagram illustrating one possible variant for the organization of an Internet of Things based on the example of portable devices. The system illustrated in FIG. 1c may include, but is not limited to, a group of different computer devices 151 of a user. The user devices 151 may include, but are not limited to, a smartphone 152, a tablet 153, a notebook 154, portable devices, such as augmented reality glasses 155, a "smart" watch 156, and others. The user devices 151 may include a group of different data transmitters 157a-157n, such as, but not limited to a heart rhythm monitor 2001 and a pedometer 2003.

It should be noted that the data transmitters 157a-157n may be present either on a single user device 151 or on multiple devices. Moreover, certain data transmitters 157a-157n may be present on multiple user devices 151 at the same time. Some of the data transmitters 157a-157n may be present as multiple units. For example, a Bluetooth module may be present on all of the user devices 151, while the smartphone 152 may contain two or more microphones needed for noise suppression and determination of the range from a sound source.

FIG. 1d presents a block diagram illustrating one possible set of data transmitters of the devices 151. For example, the following may be present among the data transmitters 157a-157n:
- heart rhythm monitor (heartbeat transmitter) 2001 may be configured to determine the pulse of the user. In one aspect, the heart rhythm monitor 2001 may contain electrodes and can measure the electrocardiogram;
- blood oxygen saturation detector 2002;
- pedometer 2003;
- fingerprint detector 2004;
- gesture detector 2005 may be configured to recognize gestures of the user;
- cameras 2006, such as a camera pointing at the surroundings of the user and a camera pointing at the eyes of the user, which may be configured to determine movements of the eyes of the user, as well as to authenticate the identity of the user from the iris or retina of the eye;
- body temperature detector 2007 of the user (for example, one having a direct contact with the body of the user, or a noncontact type);
- microphone 2008;
- ultraviolet radiation detector 2009;
- geolocation system receiver 2010, such as, but not limited to, a GPS, GLONASS, BeiDou, Galileo, DORIS, IRNSS, QZSS or other receiver;

GSM module 2011;
Bluetooth module 2012;
Wi-Fi module 2013;
room temperature detector 2014;
barometer 2015 may be configured to measure the atmospheric pressure and determine the altitude above sea level in accordance with the atmospheric pressure;
geomagnetic sensor 2016 (electronic compass) may be configured to determine the cardinal points and the azimuth;
humidity detector 2017;
illumination detector 2018 may be configured to determine the color temperature and the level of illumination;
proximity detector 2019 may be configured to determine the distance from various objects located in the vicinity;
image depth detector 2020 may be configured to obtain a three-dimensional image of space;
accelerometer 2021 may be configured to measure the acceleration in space;
gyroscope 2022 may be configured to determine a position in space;
Hall detector 2023 (magnetic field detector) may be configured to determine the strength of a magnetic field;
dosimeter/radiometer 2024 may be configured to determine the level of radiation;
NFC module 2025;
LTE module 2026.

Figure 2:
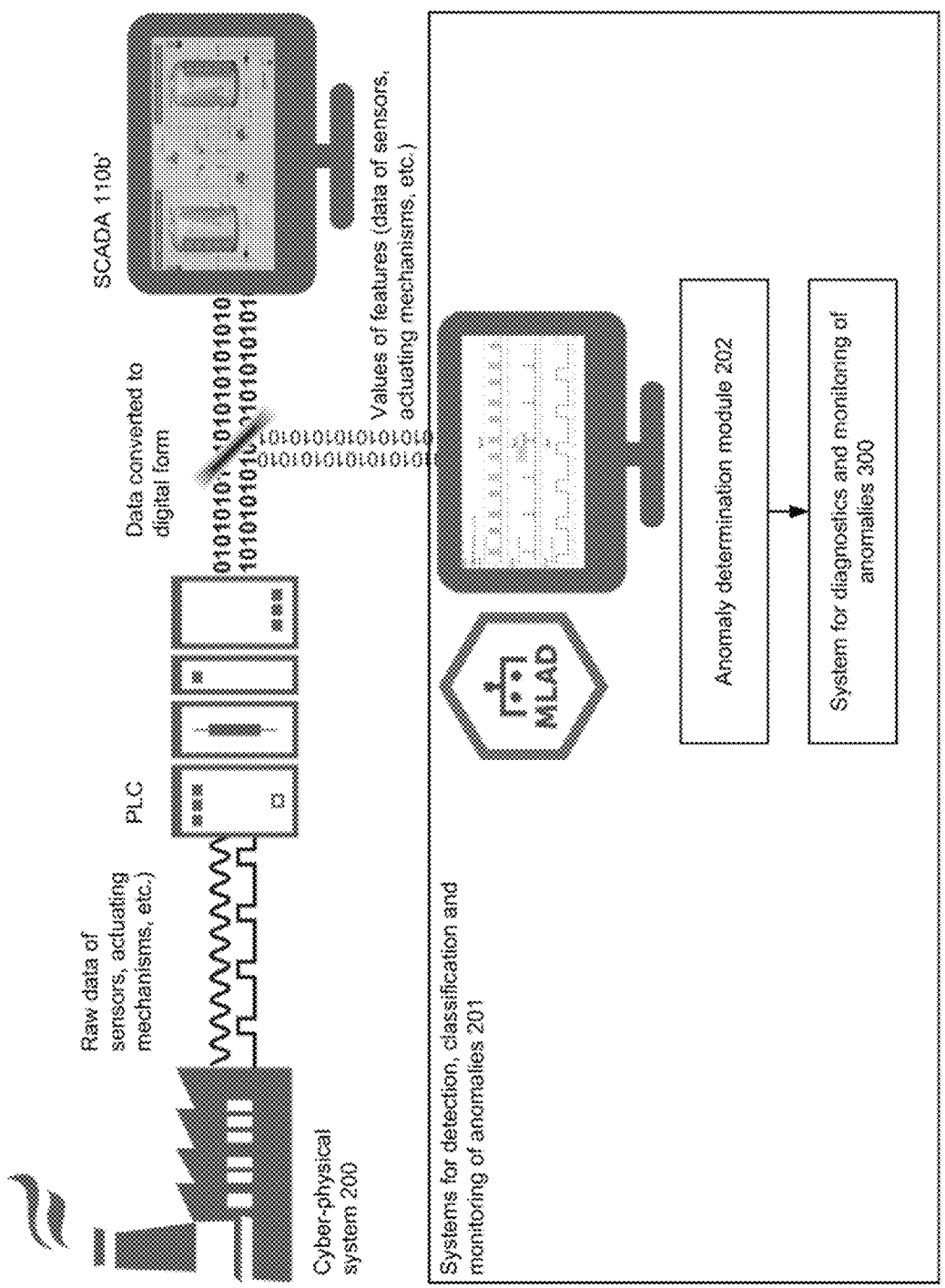
FIG. 2 is a schematic diagram showing an example of a CPS having defined characteristics, as well as systems for detecting, classifying, and monitoring of anomalies.

FIG. 2 is a schematic diagram showing an example of a cyber-physical system 200, possessing certain characteristics, as well as a system for detection, classification, and monitoring of anomalies 201. The CPS 200 is shown in FIG. 2 in a simplified aspect. Examples of a CPS 200 may include the previously described technological system (TS) 100 (see FIG. 1a-1b), the Internet of Things (see FIG. 1c-1d), and an industrial Internet of Things. For illustrative purposes only, herein TS is discussed as the basic example of a CPS 200. As noted above in conjunction with FIGS. 1a-1b, the CPS 200 may include, but is not limited to, a group of subjects of control, such as data transmitters, actuating mechanisms, and PID controllers. The data of these subjects of control in unprocessed form may be sent to a PLC via an analog signal, for example. The PLC may be configured to perform a processing of the data and may convert the data into digital form—into the values of the variables of the CPS. Variables of the CPS may include, but are not limited to, the process variables of the CPS (that is, the telemetry data of the CPS 200). The values of the variables of the CPS may be sent to the SCADA system 110b' and the discussed herein system 201.

The variables of the CPS may be the numerical characteristics of the subjects of control—the data transmitters, the actuating mechanisms, and the PID controllers. Accordingly, the values of the variables of the CPS may include, but are not limited to at least one of the values: a measurement (reading) of a data transmitter; the value of a manipulated variable of an actuating mechanism; the setpoint of an actuating mechanism; the values of the input signals of a proportional-integral-derivative regulator (PID controller); the value of the output signal of a PID controller, and other process variables of the CPS.

In an aspect, the values of the variables of the CPS may be in the form of the following set of values: [identifier (name of the variable), time, value]. For example, if the CPS variable is a temperature detector, the value of this CPS variable may be presented as follows: [temperature detector, 01.01.2022 10:00:00, 99° C.].

The values of the variables of the CPS may be used by the anomaly determination module 202, which may be configured to determine anomalies in the CPS 200. An anomaly in the CPS 200 may be an event characterizing a departure from the norm of a value of one or more variables of the CPS. An anomaly may arise in the CPS 200, for example, due to a computer attack, due to an improper or unlawful intervention in the working of the TS or TP of a person, due to a fault or deviation of the technological process, including one involving periods of change in the operating conditions, due to a transfer of the control loops to manual mode, due to improper readings of the data transmitters, as well as other well-known reasons. The information on the anomalies found in the CPS 200 may be sent to the system for diagnostics and monitoring of anomalies 300.

Figure 3:
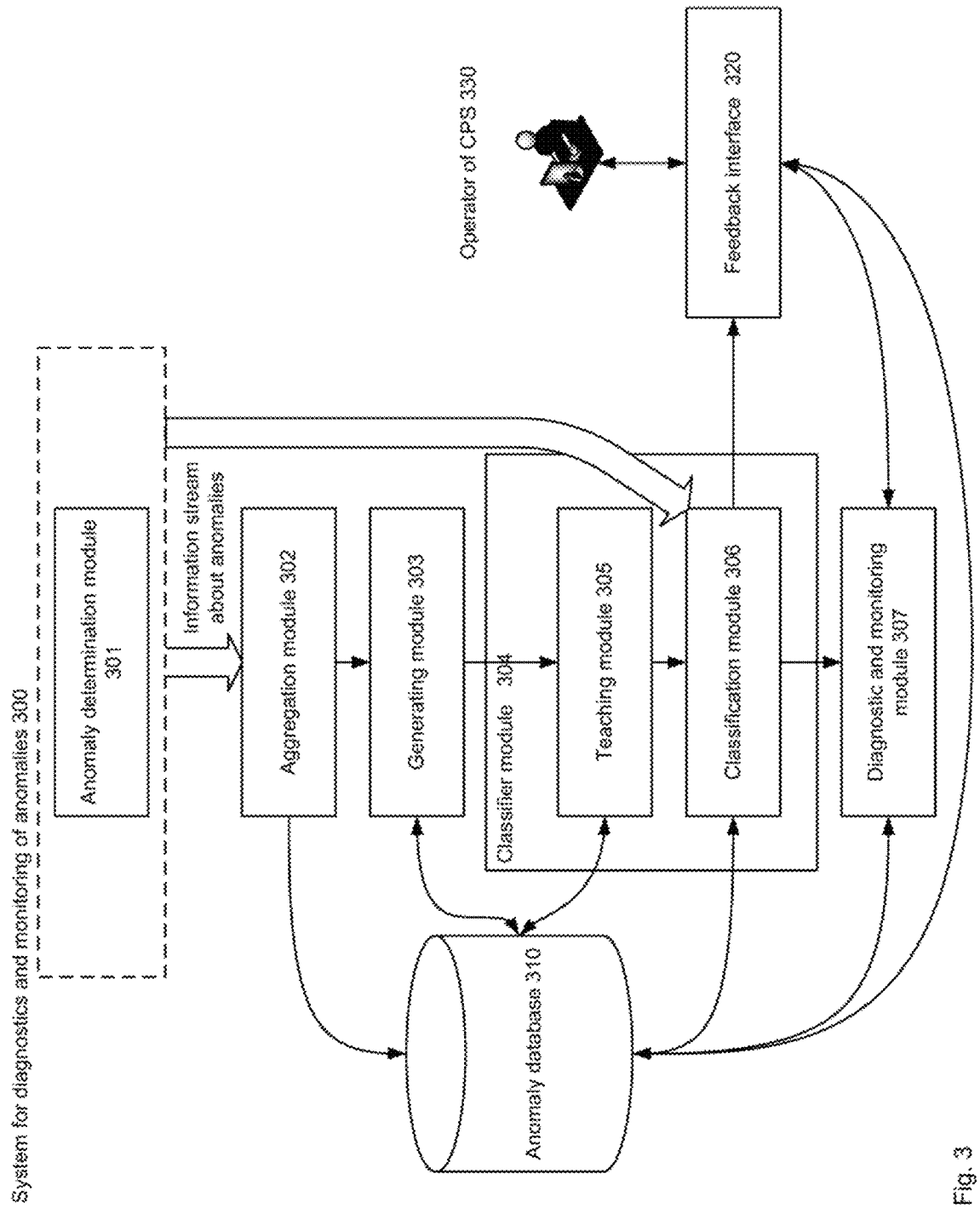
FIG. 3 is a schematic diagram of a system for diagnostics and monitoring of anomalies in a CPS.

FIG. 3 is a schematic diagram of a system for diagnostics and monitoring of anomalies 300 in a CPS 200. The system 300 may be a computer system, for example, the system shown in FIG. 7. The system 300 may include, but is not limited to, a hardware processor 21 and a memory 22 (shown in FIG. 7). The system 300 may include functional and/or hardware modules and means which in turn may contain instructions for execution on the hardware processor 21. Aspects of the aforementioned modules of the system 300 are described below.

The system 300 may include an aggregation module 302, configured to gather information about the anomalies in the CPS 200 which have been identified by the anomaly determination module 301. Examples of the anomaly determination module 301, particularly the modules 401-405, are presented in FIG. 4 described below.

Description of the anomaly determination module 301.

The anomaly determination module 301 may be configured to determine an anomaly in a CPS 401 by predicting the values of the variables of the CPS ("CPS variables") and a subsequent determination of the total error of the prediction for the variables of the CPS. The anomaly determination module 301 may be further configured to find an anomaly in the CPS 200 if the total error of the prediction is greater than a threshold value. In addition, the anomaly determination module 301 may determine the contribution of the variables of the CPS to the total error of the prediction as the contribution of the error of the prediction of the corresponding variable of the CPS to the total error of the prediction.

Figure 4:
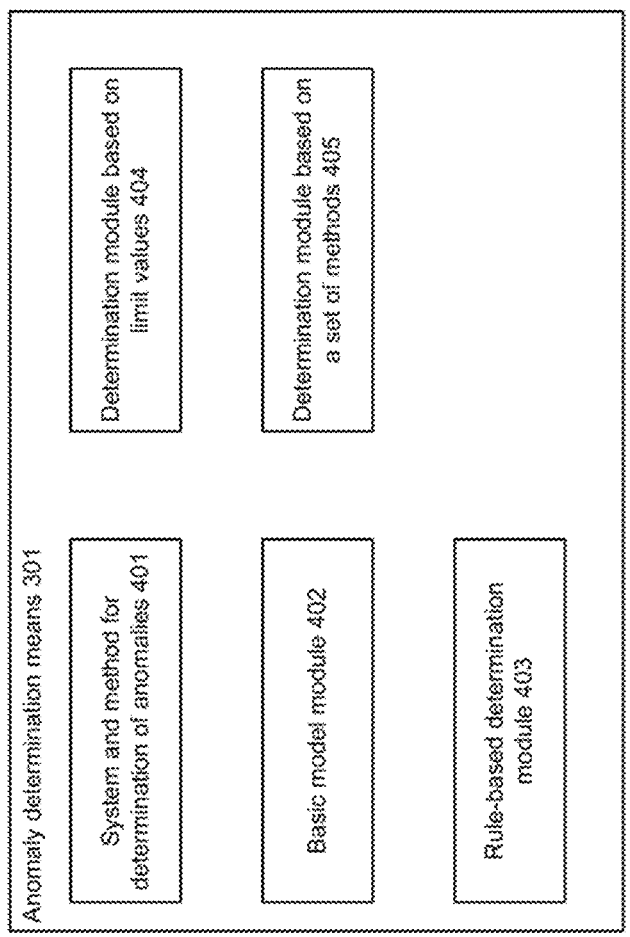
FIG. 4 is an example of anomaly determination module.

FIG. 4 is an example of anomaly determination module.

The anomaly determination module 301 may include a module for using a trained basic module of machine learning to identify the anomalies from the values of the variables of the CPS (hereinafter: the basic model module) 402. The basic model module 402 for identifying anomalies may be trained with data of a teaching sample, whether or not including known anomalies in the CPS 200 and the values of the variables of the CPS in a given period of time. To enhance the quality of the basic model 402, a testing and validation of the trained basic model 402 may be done with testing and validation samples, respectively. The testing and validation samples may include, but are not limited to, known anomalies and values of the variables of the CPS in a given period of time prior to the known anomaly in the CPS 200, but different from the teaching sample.

In yet another aspect, the anomaly determination module 301 may include a rules-based determination module 403 that may be configured to use rules for determining anomalies. Such rules may be previously formulated and obtained from the operator of the CPS 330 by means of a feedback interface 320. Such rules may contain conditions applicable to the values of the variables of the CPS which, when fulfilled, determine that an anomaly is present.

In yet another aspect, the anomaly determination module 301 may include a determination module based on limit values 404, which may be configured to determine an anomaly when the value of at least one variable of the CPS exceed a previously established range of values for that variable of the CPS. These ranges of values may be calculated from the values of the characteristics or the documentation for the CPS 200 or may be obtained from the operator of the CPS 330 by means of a feedback interface 320.

In another aspect, the anomaly determination module 301 may include a determination module based on a set of methods 405, which may be configured to use a set of two or more of the above indicated methods which may be implemented by the means and modules 401-404, determine the presence of an anomaly in the CPS 200 by averaging the results of the working of the methods of that set 405 (for example, a logical conjugation may be applied to the results of the working of the different methods).

In yet another aspect, the anomaly determination module 301 may include a graphic interface system for the determination of an anomaly manually by the operator of the CPS 330), the information concerning which can be transmitted by a feedback interface 320.

In one aspect, the information on the anomalies in the CPS 200 may further include, but is not limited to the following statements about the anomaly: the time interval for observation of the anomaly, the contribution of each variable of the CPS to the anomaly, information on the method of identifying said anomaly, the values of the variables of the CPS at each moment of the time interval. In yet another aspect, the information about the anomalies in the CPS 200 may additionally include for each variable of the CPS at least one of: the time series of values, the current magnitude of the deviation of the predicted value from the actual value, the smoothed value of the deviation of the predicted value from the actual value. In another aspect, the information about the anomalies may include information on the means (method) used to identify the anomaly.

Description of the anomaly database 310.

Referring back to FIG. 3, the information on the anomalies identified may include a list of the variables of the CPS, values of the CPS variables in the given interval of time, and the additional information described above. The aggregation module 302 may save such information for each anomaly in an anomaly database 310. The anomaly database 310 may be contained in the memory 22. The memory 22 contains a permanent storage device (ROM) 24 and a random access memory (RAM) 25 (shown in FIG. 7). Accordingly, the anomaly database 310 may be contained in both the ROM 24 and the RAM 25. The operator of the CPS 330 may also access the anomaly database 310 through a feedback interface 320, thus having complete and current information on the anomalies in the CPS 200.

Different kinds of databases may be used as the anomaly database 310, including, but not limited to: hierarchical (IMS, TDMS, System 2000), network-based (Cerebrum, Cronospro, DBVist), relational (DB2, Informix, Microsoft SQL Server), object-oriented (Jasmine, Versant, POET), object-relational (Oracle Database, PostgreSQL, FirstSQL/J), functional, databases for time series (InfluxDB), and the like. Moreover, the anomaly database 310 may be implemented in the form of a list or a data archive on anomalies kept in a file in memory 22.

Description of the classifying features.

The system 300 may also include a generating module 303, connected to the aggregation module 302 and configured to form the classifying features for the identified anomalies based on the information gathered. These classifying features may be saved in the anomaly database 310.

In an aspect, the generating module 303 may be configured to form the classifying features by assigning to them the values of the variables of the CPS in their initial form, or in a transformed form, or as a result of applying a function of said variables of the CPS. For example, the sample mean or the sample variance of the variables of the CPS may be chosen as the classifying feature. In another aspect, the classifying feature may be obtained by the generating module 303 as the result of a Fourier analysis of the variables of the CPS. In yet another aspect, the classifying feature may be obtained as the result of applying a principal components analysis (PCA analysis) of the variables of the CPS. In yet another aspect, information about one of the anomaly determination modules 301 that was used to identify the anomaly may also be chosen as the classifying features. As a result, the list of classifying features may be presented by the generating module 302 in the form of a vector of values of the classifying features. The set of classifying features as well as the method for forming them may be specified in advance or obtained through the feedback interface 320 from the operator of the CPS 330. In particular, the set of such classifying features and the techniques for their numerical calculation may be known in advance for a particular type of CPS 200 and the processes occurring in this type of CPS 200. For example, in case of diagnostics and monitoring of anomalies of the wall of a petroleum pipeline by methods of magnetic defectoscopy, the size of the echo from the defect in the diagnostic data, the maximum value of this echo, the shape of the echo signal, and so forth, may be the classifying features.

Description of the classification steps.

The system 300 may also include a classifier module 304, connected to the generating module 303. The classifier module 304 may further include a teaching module 305 and a classification module 306. The teaching module 305 may be configured to adjust the rules for the classification based on the classifying features from the anomaly database 310. In an aspect, these classification rules may include supervised machine learning models, or unsupervised machine learning models (e.g., clustering models). In these aspects, the adjusting of the rules for the classification may involve the formation of a learning sample, including the values of the classifying features for a historical period of time containing the time interval for the observation of the anomalies. Furthermore, testing and validation samples may also be formed by the teaching module 305, likewise containing the values of the classifying features for a historical period of time. These samples may be kept in the anomaly database 310.

In an aspect, when the classification of the anomalies is done using an unsupervised model, that is, by using a clustering model, one or more of the following methods can be chosen by the classifier module 304 as the clustering model:
    hierarchical clustering;
    density-based spatial clustering of applications with noise (DBSCAN);
    algorithm for growing neural gas (GNG);
    algorithm for ordering points to identify the clustering structure (OPTICS).

It should be noted that the aforementioned methods enable comparison of anomalies and formation of classes from several anomalies that have been identified by different anomaly determination modules 301. It should be noted that other clustering methods known in the art can also be used, such as, but not limited to, the K-Means method.

In another aspect, the anomalies may be classified by a marked-up historical sample into predetermined classes. In other words, the anomalies may be classified using a classification model (supervised learning model). As the classification model, the classification module 306 may select any machine learning model for classification that is known in the art, including, but not limited to, logistical regression, neural nets, decision trees, gradient boosting on decision trees, the method of reference vectors, and the like. The list of predetermined classes may be obtained from the operator of the CPS 330 by a feedback interface 320. In another aspect, the list of predetermined classes may be obtained by the classification module 306 from a clustering method.

Furthermore, a set of two or more clustering models or classification models may be used by the classification module 306, making a decision by the voting of the individual models in the set.

The classification module 306 may be also configured to adjust rules of classification to carry out a classification of the identified anomalies into at least two classes based on the classifying features. The classification module 306 may carry out the classification of the anomalies both from the anomaly database 310 and a classification of anomalies arriving from the anomaly determination module 301, in either real time mode or streaming mode. In other words, the generating module 303 may also be configured to work in streaming mode, processing all of the incoming anomalies sequentially or in parallel.

The resulting classes of anomalies may be kept in the anomaly database 310 and when needed the classes of anomalies may be sent to the operator of the CPS 330 via the feedback interface 320.

The system 300 may also include a diagnostic and monitoring module 307, connected to the anomaly database 310, the classifier module 304 and the feedback interface 320. The diagnostic and monitoring module 307 may be configured to obtain information about the anomalies and the classes of the anomalies, after which the diagnostic and monitoring module 307 may perform a diagnosis and then a monitoring of the anomalies of each class of anomalies individually. The diagnostic and monitoring module 307 will be discussed in greater detail below, in conjunction with FIG. 5.

Description of the diagnostic and monitoring module 307.

Figure 5:
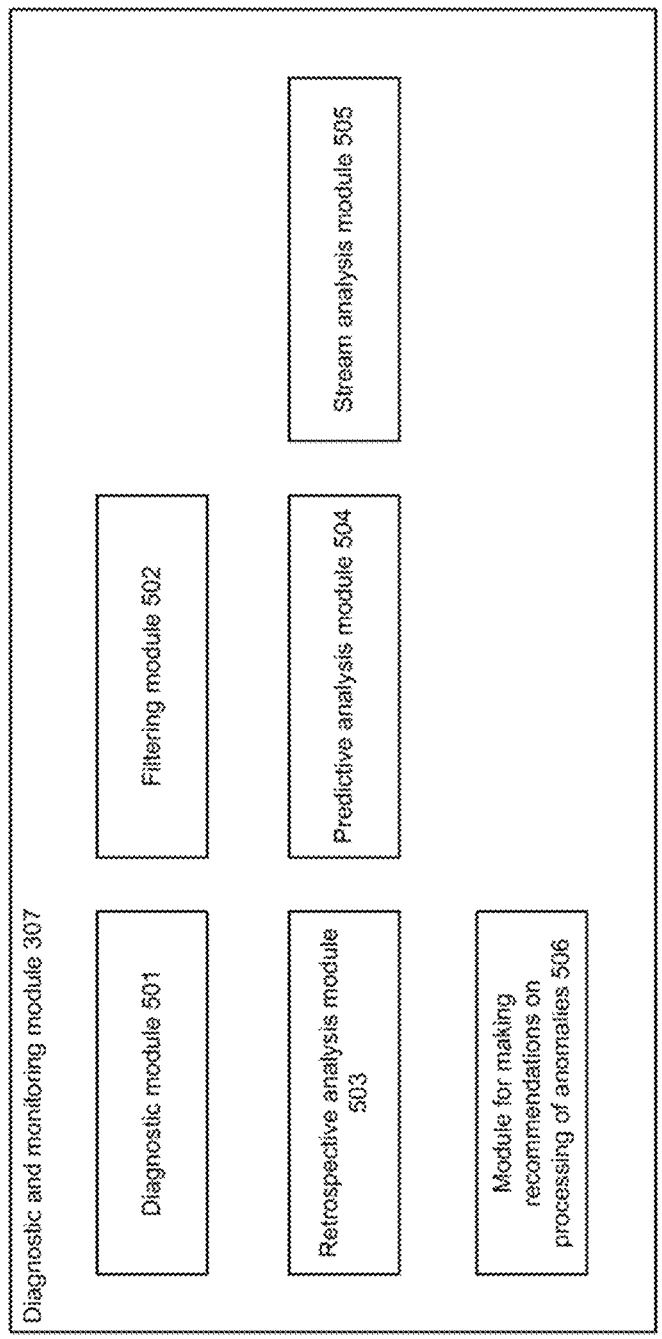
FIG. 5 is an example of the module for diagnostics and monitoring of anomalies.

FIG. 5 is an example of the module for diagnostics and monitoring of anomalies. Thus, the diagnostic and monitoring module 307 may include a diagnostic module 501, a filtering module 502, a retrospective analysis module 503, a predictive analysis module 504, a stream analysis module 505 and a module for making recommendations as to the processing of anomalies 506.

The monitoring of anomalies of each class may involve performing, with a given frequency, at least one of the following types of analysis based on the data of the values of the characteristics of each class of anomalies: retrospective analysis by the module 503, predictive analysis by the module 504, and stream analysis by the module 505. It should be noted that the characteristics of each class of anomalies are equivalent to anomaly characteristics associated with each of the anomaly classes. The aforementioned monitoring frequency may be predetermined or indicated by the operator of the CPS 330 via the feedback interface 320. In an aspect, the monitoring frequency may be determined by the intervals of time in which the monitoring is done. For example, the monitoring frequency may be every hour or every day. In another aspect, the monitoring frequency may be determined by the conditions under which the monitoring occurs. For example, the monitoring frequency may be determined by the diagnostic and monitoring module 307 upon appearance of a predetermined number of new anomalies. Thus, the results for the monitoring of the anomalies of each class (information about the anomalies) may be complete and up to date.

The diagnostic module 501 may be configured to calculate a certain set of characteristics for the anomalies of each class. In a particular aspect, this set of characteristics may be calculated based on the characteristics of the technological processes of the CPS 200, the makeup of the equipment and subassemblies of the CPS 200, the industry standards for the given CPS 200. For example, the values of the mentioned characteristics may be calculated by the diagnostic module 501 by assigning at least the following values: CPS variable values determined for the given class of anomalies, the derivatives of such variables of the CPS 200, the statistical characteristics of the values of the CPS variables, the numerical values of a frequency analysis of the CPS variables, and the like. Thus, for a broad class of CPS 200, protection against potential computer attacks on the technological process of the CPS 200 is an urgent technical problem. One non-limiting example of such computer attacks is spoofing or substituting the data of certain CPS variables in order to disrupt the feedback loops in the control circuits of the CPS 200 with subsequent potential damage to the equipment and subassemblies of the CPS 200. In order to prevent such computer attacks, the predictive method of anomaly determination may be used. The selected characteristics may include the feature of "sticking" (repetition of values over time) of certain CPS variables in the same position, and the time for such "sticking". In yet another aspect, the substitution of data may be done by multiple repetition of the same retrospective portion of the data. The characteristics which may be selected in such a case may be the window statistical points of such as, but not limited to, a signal, namely, the sampling points (such as the sample mean), the variance, the autocorrelation and cross correlation points of the signal, and the like.

Thus, in a particular aspect, the values of the characteristics of a class of anomalies may be calculated by the diagnostic module 501, based on the CPS variables. For example, the diagnostic module 501 may calculate the values for at least one of the following characteristics: the minimum and maximum values of the CPS variables, the statistical characteristics of the CPS variables (in particular, the sample means, the sample variance), the presence and the characteristics of trends in the behavior of the CPS variables, the spectral characteristics of the CPS variables (such as, the coefficients of the Fourier transform, the presence of certain vibrational modes, and other characteristics.

Moreover, the characteristics values may include, but are not limited to, the calculated value of the level of criticality of a particular anomaly, the frequency of appearance of anomalies of a given class, the periodicity of such an appearance, the appearance of certain vibrational modes on a previously known or unknown frequency, and the like. As used herein, the level of criticality of an anomaly is defined as the exceeding of a predetermined level or levels by the value of a given characteristic or the values of a given set of characteristics of an anomaly, where the appearance of negative processes in the TP of the CPS is possible. Thus, for rotational equipment, including such critically important subassemblies as circulation pumps, anomalies involving the vibration of the rotational mechanisms are characteristic, and these characteristics may be diagnosed in general from data of vibrational velocity and vibrational acceleration sensors. When dealing with the characteristics of the anomalies of this kind, the diagnostic module 501 may select the maximum window values of the vibrational analysis data. Furthermore, the set of characteristics may be broadened to include characteristics such as, but not limited to, the window Fourier transform and an assigned range of modes for the monitoring. Such an expanded set of characteristics may enable the diagnostic module 501 to perform a thorough diagnostics and monitoring of the vibrational anomalies of circulation pumps, and the detecting at an early stage of the appearance of new parasitic vibrational modes, predicting the development of such anomalies over time.

In another aspect, the set of characteristics for anomalies of each class may be obtained for example from the operator of the CPS 330 via the feedback interface 320.

The filtering module 502 may be configured to create rules for the filtering of anomalies of a class based on the results of the diagnostics of the anomalies by the diagnostic module 501. For example, the filtering module 502 may create filtration rules wherein all anomalies with characteristics as obtained by the module 501 and exceeding certain ranges of predetermined values may be let through. For example, all anomalies from classes with a low level of criticality may be filtered out, that is, let through. Another example of anomalies which may need to be filtered out are wrongly determined anomalies or the anomalies specially noted by the operator of the CPS 330, as well as anomalies involving legitimate human intervention in the processes of the enterprise. Such anomalies may be picked out either by the operator of the CPS 330 or in automatic manner by the filtering module 502, for example, according to the data of the setpoints of the PID controllers in places where they change abruptly.

The retrospective analysis module 503 may be configured to perform retrospective analysis of the characteristics of anomalies (as obtained by the diagnostic module 501) involving a single piece of equipment and class of anomalies. The retrospective analysis module 503 may select the values of the characteristics of the classes of anomalies in the CPS 200 from the anomaly database 310 for a single piece of equipment or subassembly selected by the operator of the CPS 330 for a given time of observation. The values of the characteristics of the anomalies for each class of anomalies, as calculated by the diagnostic module 501, may then be used by the retrospective analysis module 503 to perform an analysis. The analysis may be performed in each class of anomalies, of the vectors (the set of values) of the characteristics of the anomaly for a certain historical interval of time, by applying machine learning models for the retrospective analysis. The machine learning models utilized by the retrospective analysis module 503 may include, but are not limited to, regression analysis models and interpolation models. The aforementioned models may receive, as their input, the values of the characteristics of the anomaly for the given historical interval of time. The result of the retrospective analysis of the characteristics of the anomaly performed by the retrospective analysis module 503 may include a plot of the retrospective trends for the development of the anomaly, a calculation of the speed and monotonicity of development of the anomaly, a calculation of the magnitude of deviation of the values of the characteristics of the anomaly from the trend, and the like. Moreover, the result generated by the retrospective analysis module 503 may be sent to the operator of the CPS 330 by the feedback interface 320 for analysis of the dynamics of development of the anomaly in the past and for an analysis of the causes of the development of the anomaly of this class.

The data generated by the retrospective analysis module 503, namely, the values of the characteristics of the anomaly in a certain historical interval of time, may be used as supplemental input data for the predictive analysis module 504. In an aspect, the predictive analysis module 504 may be configured to predict the development of anomalies pertaining to a single piece of equipment and a single class. For example, the predictive analysis module 504 may predict the values of the characteristics of anomalies in the future. The data of the vectors of the characteristics of an anomaly, taken for a certain historical interval, may be analyzed by the predictive analysis module 504 using machine learning models for the predictive analysis. For example, the predictive analysis module 504 may utilize regression analysis models and extrapolation models, the results generated by which may be predicted values for the vector of the characteristics in the given interval of time of the forecast. Moreover, the moments of time when certain characteristics reach predetermined levels (levels of criticality for the anomalies of a given class) may be calculated by the predictive analysis module 504. Levels of criticality for the anomalies may be used by the operators of the CPS 330 to plan the maintenance and repair work.

The stream analysis module 505 may be configured to perform a stream analysis of the values of the characteristics of each class of anomalies. In other words, the stream analysis module 505 may be configured to analyze, the values obtained at a current moment of time or for a given input window (input interval of time). The stream analysis module 305 may record information containing classes of anomalies and values of characteristics of each class of anomalies in the anomaly database 310 in real time mode. In other words, the stream analysis module 305 may record generated information as the information arrives concerning the anomalies which have appeared. Furthermore, the stream analysis module 305 may perform a comparison of the values of the characteristics of each class of anomalies with predetermined critical values, may make a notation in the anomaly database 310 indicating said exceeding of the critical values, and additionally may send to the operator of the CPS 330 via the feedback interface 320 a notification indicating the exceeding of the critical values.

In yet another aspect, the module for making recommendations as to the processing of the anomalies 506 may be configured to compare the results obtained upon carrying out the aforementioned kinds of analysis as performed by one of the modules 503-505 with the rules of criticality. In the event of at least one of the rules of criticality being fulfilled, the module for making recommendation as to the processing of anomalies 506 may generate a list of actions for the processing of the anomalies in accordance with the rule so fulfilled.

In a particular aspect, the conditions of the rules of criticality may include the exceeding of given thresholds by the value of one or more CPS characteristics, the presence of a trend toward increasing of the value of one or more characteristics of the CPS, and the like.

In a particular aspect, the list of actions for processing of anomalies may include, but is not limited to the actions listed below:

a) Performing an adjustment for the data transmitter, actuating mechanism, or PID controller in which the anomaly was identified. This adjustment may be done based on the CPS characteristics, in accordance with the documentation for the CPS.

b) Disconnection of the data transmitter, actuating mechanism, or PID controller in which the anomaly was identified. For example, if the identified anomaly indicates a faulty data transmitter or a use of the data transmitter by hackers and on the like.

c) Changing of the computer security settings of the CPS. For example, the various security protocols of the CPS can be renewed, a complete antivirus scan performed, a check for vulnerabilities, the disconnecting of vulnerable network connections, and the like.

d) Automatic correction of the control process. In an aspect, methods for correction of the control may be specified based on the class of the anomalies.

e) Notification of the SCADA system 110*b*' as to the classes of anomalies identified, as well as the results of the diagnostics and monitoring of anomalies of each class.

A number of examples of the implementation of the present disclosure are presented below.

Thus, one class of anomalies generated as a result of a classification performed by the classifier module 304 may include all anomalies involving a brief "sticking" of a level gauge sensor used in viscous paraffin media characteristic of the petrochemical industry. In the given example, the "sticking" of the sensor means that sensor's readings periodically show zero or are generally incorrect, which is not a critical anomaly. All such non-critical anomalies may be combined by the classifier module 304 into a single class, and the further analysis in the class may include diagnostics of the anomalies of the class, that is, determining the values of such characteristics of the class of anomalies as the frequency and duration of such "sticking" and subsequent monitoring of the values of those characteristics of the anomalies of the class. Furthermore, if there is a significant change in the values of these characteristics, the corresponding information may be saved by the classifier module 304 in the anomaly database 310, and may also be sent to the operator of the CPS 330 via the feedback interface 320.

Another example is the situation when the production technology allows for a brief exceeding of a given range of change by at least one variable of the CPS, but a prolonged or overly frequent exceeding is not permitted. If such prolonged or overly frequent exceeding occurs, an anomaly arises, which may be detected by one of the anomaly determination modules 301. All such identified anomalies may then be combined by the classifier module 304 into a single class with subsequent diagnostics of each class of anomalies by calculating the values of the characteristics of the anomalies of each class. Such characteristics may include, for example, the level of criticality of the anomaly, the frequency of appearance of the anomaly, the periodicity of appearance of the anomaly. The diagnostics and monitoring module 307 may be configured to perform subsequent monitoring of the calculated values of the characteristics of the anomalies of the class—for example, the frequency of appearance of the anomaly. If the value of the characteristic "frequency of appearance of the anomaly" increases over time, the diagnostic and monitoring module 307 may inform the operator of the CPS 330 via the feedback interface 320 as to the critical rise in the value of that characteristic. Such a rise in the value of the characteristic "frequency of appearance of the anomaly" may be determined by the predictive analysis module 504 by predicting the values of that characteristic, and the operator of the CPS 330 may be informed if that prediction exceeds a given threshold of the characteristic.

Yet another example is the internal diagnostics of pipelines carried out by internal pipeline inspection tools. There is a broad set of classes of defects of pipeline walls, including cracks, corrosion, and dents, for which diagnostic data may be used to determine the values of a number of specific characteristics selected for the class of anomalies, such as the length, width, and depth of the defects. Monitoring of the values of such characteristics of anomalies of the class allows the pipeline operators to plan the maintenance and repair work and avoid costly shutdowns and accidents.

Figure 6:
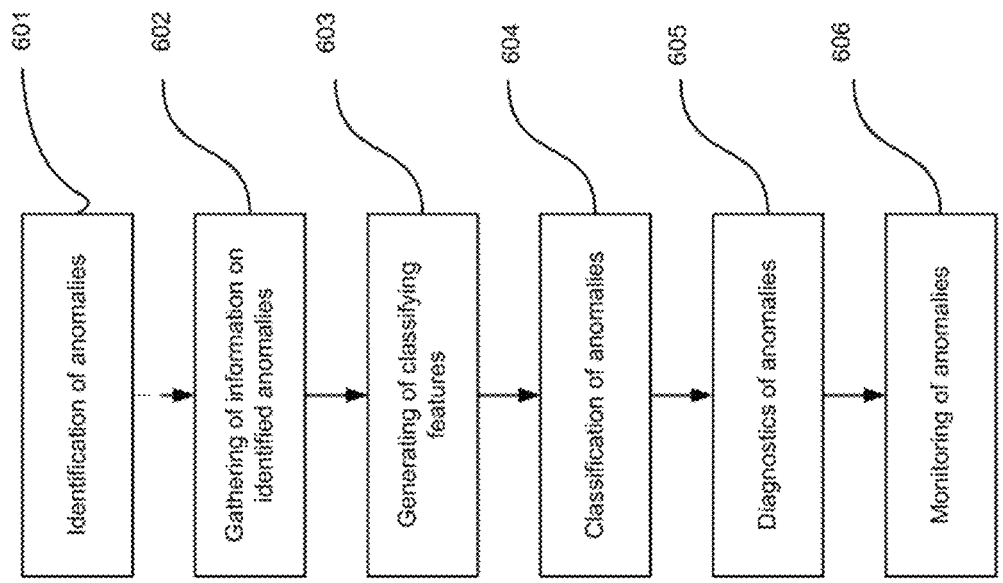
FIG. 6 is a flowchart illustrating an example method for diagnostics and monitoring of anomalies in a CPS.

FIG. 6 is a flowchart illustrating an example method for diagnostics and monitoring of anomalies in a CPS. In step 601, the anomaly determination module 301 may identify the anomalies in the CPS 200 by analysis of the values of the variables of the CPS. Next, in step 602, information may be obtained as to the anomalies found in the CPS 200. The information on the anomalies identified may include a list of the variables of the CPS, values of the CPS variables in the given interval of time, and the additional information described above. The aggregation module 302 may save such information for each anomaly in an anomaly database 310. After this, in step 603, classifying features may be generated for the identified anomalies based on the information gathered by generating module 302. In particular, the set of such classifying features and the techniques for their numerical calculation may be known in advance for a particular type of CPS 200 and the processes occurring in this type of CPS 200. For example, in case of diagnostics and monitoring of anomalies of the wall of a petroleum pipeline by methods of magnetic defectoscopy, the size of the echo from the defect in the diagnostic data, the maximum value of this echo, the shape of the echo signal, and so forth, may be the classifying features. Then, in step 604, a classification of the anomalies may be performed by the classifier module 604 into at least two classes based on the classifying features so generated. Furthermore, a set of two or more clustering models or classification models may be used by the classification module 306, making a decision by the voting of the individual models in the set. In step 605, the diagnostic module 501 may perform diagnostics for each class of anomalies by calculating the values of the characteristics of each class of anomalies. The filtering module 502 may be configured to create rules for the filtering of anomalies of a class based on the results of the diagnostics of the anomalies by the diagnostic module 501. As a result, in step 606, a monitoring of the anomalies may be performed by the diagnostic and monitoring module 307 based on the results of the diagnostics for each class of anomalies—i.e. based on the calculated values of the anomaly characteristics. The diagnostic and monitoring module 307 is discussed in greater detail above, in conjunction with FIG. 5. The particular aspects previously presented in FIGS. 2-5 are also applicable to the method illustrated in FIG. 6. It should also be noted that the proposed method can work also in streaming mode, that is, when a new anomaly appears in the CPS it may be added to one of the classes generated, or a new class will be generated for it.

Thus, the proposed disclosure to solve the stated technical problem and achieve the stated technical result. Namely, the technical result of assuring an automated diagnostics and monitoring of anomalies in a CPS may be accomplished by the classification of the anomalies, the diagnostics of the anomalies of each class, and the subsequent monitoring of the anomalies of each class of anomalies.

Figure 7:
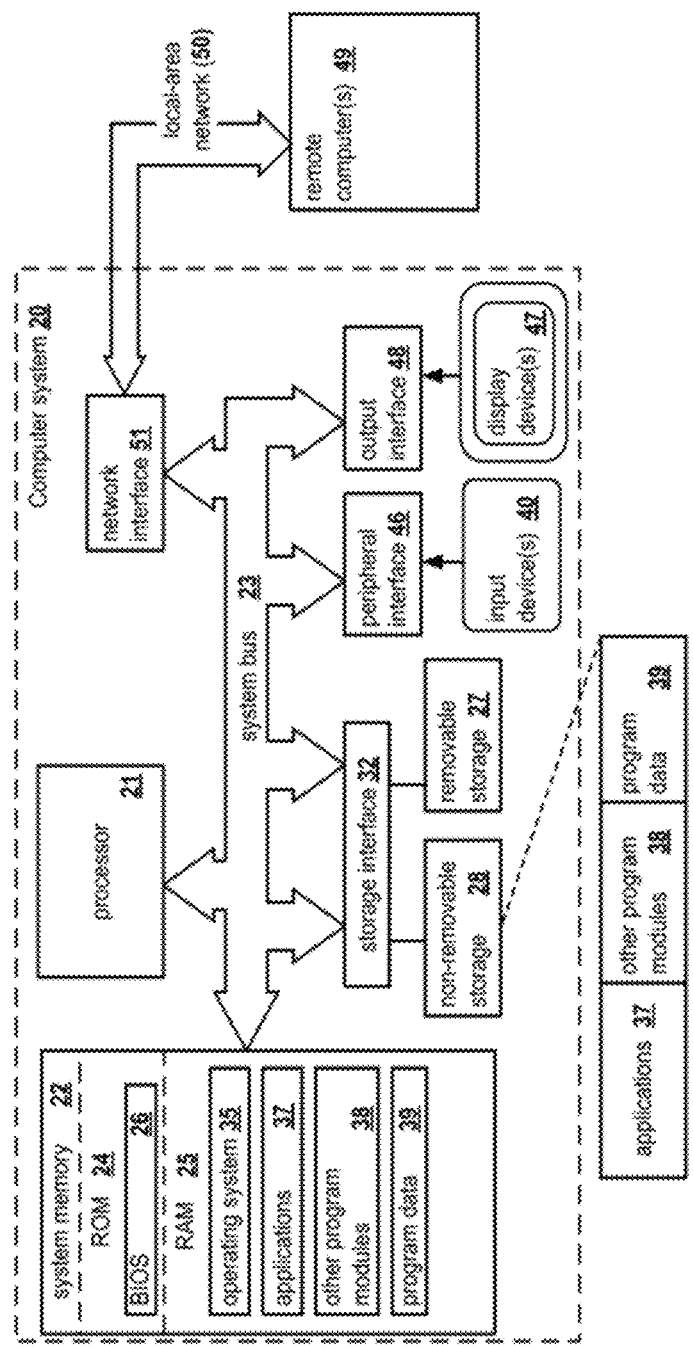
FIG. 7 shows an example of a computer system on which variant aspects of systems and methods disclosed herein may be implemented.

FIG. 7 shows an example of a computer system on which variant aspects of systems and methods disclosed herein may be implemented. The computer system 20 may represent the system for diagnostics and monitoring of anomalies of FIG. 3 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for diagnostics and monitoring of anomalies in a cyber-physical system (CPS), the method comprising:
   obtaining information related to anomalies identified in the CPS, wherein the obtained information comprises at least one value of one or more CPS variables;
   generating one or more classifying features of the identified anomalies in the CPS based on the obtained information;
   performing classification of the identified anomalies in the CPS into two or more anomaly classes based on the generated classifying features, wherein each of the two or more anomaly classes is associated with one or more anomaly characteristics;
   performing diagnostics of anomalies in each of the two or more anomaly classes by calculating values of the anomaly characteristics associated with each of the two or more anomaly classes; and
   monitoring anomalies of each of the two or more anomaly classes by performing, at a predetermined frequency, at least one of the following types of analyses using the calculated values of the anomaly characteristics associated with each of the two or more anomaly classes:
      retrospective analysis of additional characteristics of the two or more anomaly classes for a predetermined historical period of time;
      predictive analysis of values of the anomaly characteristics associated with each of the two or more anomaly classes; and
      streaming analysis of values of the anomaly characteristics associated with each of the two or more anomaly classes.

2. The method of claim 1, wherein the anomalies are identified by performing steps of:
   predicting at least one value of the one or more CPS variables;
   determining total forecast error based on the predicted at least one value of the one or more CPS variable; and
   identifying an anomaly if the determined forecast error exceeds a predefined threshold value.

3. The method of claim 1, wherein the anomalies are identified by performing steps of:
   identifying an anomaly by applying a trained machine learning model to the at least one value of the one or more CPS variables.

4. The method of claim 1, wherein the anomalies are identified by performing steps of:
   determining if at least one value of the one or more CPS variables lies outside bounds of a previously specified range of values for the corresponding CPS variable; and
   identifying an anomaly in response to determining that the value of at least one of the one or more CPS variables lies outside bounds of the previously specified range of values for the corresponding CPS variable.

5. The method of claim 1, wherein the obtained information further comprises at least one of: a time interval of observation of the detected anomaly, contribution of each of the one or more CPS variable to the detected anomaly, information about detection method of the detected anomaly, at least one value of the one or more CPS variables at each time instance of the time interval of observation.

6. The method of claim 1, wherein the obtained information further comprises for each of the one or more CPS variables: a time series of the corresponding CPS variable values; a current magnitude of the deviation of the predicted CPS variable value from an actual CPS variable value; a smoothed value of the deviation of the predicted CPS variable value from the actual CPS variable value.

7. The method of claim 1, wherein the at least one value of the one or more CPS variables comprise at least one of: a measurement of a data transmitter; a value of a manipulated variable of an actuating mechanism; a setpoint of the actuating mechanism; one or more values of input signals of a proportional-integral-derivative controller (PID controller); a value of an output signal of the PID controller.

8. The method of claim 1, wherein monitoring the CPS to detect anomalies further comprises comparing results of the performed analysis with one or more rules of criticality and, in response to determining that at least one of the rules of criticality is fulfilled, generating a list of actions for processing of the detected anomalies in accordance with the fulfilled rule of criticality.

9. The method of claim 1, wherein the one or more classifying features are generated by assigning to each of the one or more classifying features the one or more CPS variables.

10. The method of claim 1, wherein the two or more anomaly characteristics include at least one of: calculated value of a level of criticality of a particular anomaly, frequency of appearance of anomalies of a particular class, periodicity of appearance of anomalies of a particular class.

11. The method of claim 1, wherein the one or more classifying features are generated based on a feedback from an operator of the CPS.

12. The method of claim 1, wherein performing classification of the identified anomalies further comprises performing the classification using one of a trained classification model or a trained clustering model, wherein input data for the trained classification model or the trained clustering model comprises the one or more classifying features, and wherein a result of the classification comprises an assignment of an anomaly class to each of the identified anomalies.

13. A system for diagnostics and monitoring of anomalies in a cyber-physical system (CPS), the system comprising:
 a memory and a hardware processor configured to:
  obtain information related to anomalies identified in the CPS, wherein the obtained information comprises at least one value of one or more CPS variables;
  generate one or more classifying features of the identified anomalies in the CPS based on the obtained information;
  perform classification of the identified anomalies in the CPS into two or more anomaly classes based on the generated classifying features, wherein each of the two or more anomaly classes is associated with one or more anomaly characteristics;
  perform diagnostics of anomalies in each of the two or more anomaly classes by calculating values of the anomaly characteristics associated with each of the two or more anomaly classes; and
  monitor anomalies of each of the two or more anomaly classes by performing, at a predetermined frequency, at least one of the following types of analyses using the calculated values of the anomaly characteristics associated with each of the two or more anomaly classes:
   retrospective analysis of additional characteristics of the two or more anomaly classes for a predetermined historical period of time;
   predictive analysis of values of the anomaly characteristics associated with each of the two or more anomaly classes; and
   streaming analysis of values of the anomaly characteristics associated with each of the two or more anomaly classes.

14. The system of claim 13, wherein the hardware processor configured to identify anomalies is further configured to:
 predict at least one value of the one or more CPS variables;
 determine total forecast error based on the predicted values of the one or more CPS variables; and
 identify an anomaly if the determined forecast error exceeds a predefined threshold value.

15. The system of claim 13, wherein the hardware processor configured to identify anomalies is further configured to:
 identify an anomaly by applying a trained machine learning model to the at least one value of the one or more CPS variables.

16. The system of claim 13, wherein the hardware processor configured to monitor the CPS to identify anomalies is further configured to:
 determine if at least one value of the one or more CPS variables lies outside bounds of a previously specified range of values for the corresponding CPS variable; and
 identify an anomaly in response to determining that the value of at least one of the one or more CPS variables lies outside bounds of the previously specified range of values for the corresponding CPS variable.

17. The system of claim 13, wherein the obtained information further comprises at least one of: a time interval of observation of the detected anomaly, contribution of each of the one or more CPS variable to the detected anomaly, information about detection method of the detected anomaly, at least one value of the one or more CPS variables at each time instance of the time interval of observation.

18. The system of claim 13, wherein the obtained information further comprises for each of the one or more CPS variables: a time series of the corresponding CPS variable values; a current magnitude of the deviation of the predicted CPS variable value from an actual CPS variable value; a smoothed value of the deviation of the predicted CPS variable value from the actual CPS variable value.

19. A non-transitory computer readable medium storing thereon computer executable instructions for diagnostics and monitoring of anomalies in a cyber-physical system (CPS), including instructions for:
 obtaining information related to anomalies identified in the CPS, wherein the obtained information comprises at least one value of one or more CPS variables;
 generating one or more classifying features of the identified anomalies in the CPS based on the obtained information;
 performing classification of the identified anomalies in the CPS into two or more anomaly classes based on the generated classifying features, wherein each of the two or more anomaly classes is associated with one or more anomaly characteristics;

performing diagnostics of anomalies in each of the two or more anomaly classes by calculating values of the anomaly characteristics associated with each of the two or more anomaly classes; and monitoring anomalies of each of the two or more anomaly classes by performing, at a predetermined frequency, at least one of the following types of analyses using the calculated values of the anomaly characteristics associated with each of the two or more anomaly classes:
  retrospective analysis of additional characteristics of the two or more anomaly classes for a predetermined historical period of time;
  predictive analysis of values of the anomaly characteristics associated with each of the two or more anomaly classes; and
  streaming analysis of values of the anomaly characteristics associated with each of the two or more anomaly classes.

* * * * *